United States Patent [19]
Tokumasu

[11] Patent Number: 5,983,656
[45] Date of Patent: Nov. 16, 1999

[54] AIR CONDITIONING SYSTEM

[75] Inventor: Hiroshi Tokumasu, Higashimatsuyama, Japan

[73] Assignee: Zexel Corporation, Tokyo, Japan

[21] Appl. No.: 09/072,141

[22] Filed: May 4, 1998

[30] Foreign Application Priority Data

May 26, 1997 [JP] Japan .................................. 9-151657

[51] Int. Cl.⁶ .............................. F25B 27/00; F25B 29/00
[52] U.S. Cl. .................................. 62/216; 62/79; 165/240
[58] Field of Search .................................. 62/323.4, 115, 62/79, 216, 238.6; 165/240

[56] References Cited

U.S. PATENT DOCUMENTS

| | | | |
|---|---|---|---|
| 2,619,326 | 11/1952 | McLenegan | 62/238.6 X |
| 3,529,433 | 9/1970 | Chambers | 62/216 X |
| 4,506,519 | 3/1985 | Morse et al. | 62/190 |

FOREIGN PATENT DOCUMENTS 7-290940  11/1995  Japan .
7-293437  11/1995  Japan .

*Primary Examiner*—William Wayner
*Attorney, Agent, or Firm*—Frishauf, Holtz, Goodman, Langer & Chick

[57] ABSTRACT

An air conditioning system is provided. A driving force is constantly transmitted to a clutchless compressor via a pulley. A condenser causes a high-temperature and high-pressure gaseous refrigerant compressed by the clutchless compressor to change to a high-pressure liquid refrigerant through heat exchange with external air. An expansion valve adiabatically expands the liquid refrigerant to thereby change the liquid refrigerant into a low-pressure atomized refrigerant. An evaporator evaporates the atomized refrigerant through heat exchange with the external air. The evaporator is heated when a thermal load on the compressor is low.

11 Claims, 2 Drawing Sheets

AIR CONDITIONING SYSTEM

BACKGROUND OF THE INVENTION

1. Field of the Invention

This invention relates to an air conditioning system, and more particularly to an air conditioning system for an automatic vehicle equipped with a clutchless compressor to which a driving force is constantly transmitted from an engine installed on the vehicle.

2. Description of the Prior Art

Conventionally, an air conditioning system of this kind includes a clutchless compressor to which a driving force is constantly transmitted from an engine via a pulley, a condenser for causing a gaseous refrigerant compressed to high temperature and high pressure by the clutchless compressor to change to a high-pressure liquid refrigerant through heat exchange with external air, an expansion valve for adiabatically expanding the liquid refrigerant to thereby change the refrigerant into a low-pressure atomized refrigerant, and an evaporator for evaporating the atomized refrigerant through heat exchange with the external air.

As the above clutchless compressor, there has been proposed a variable capacity swash plate compressor in which the inclination angle of a swash plate thereof changes according to a suction pressure to thereby change a length of piston stroke for increasing or decreasing the delivery quantity of the compressor.

When a variable capacity swash plate compressor whose minimum delivery quantity is not reduced to zero is adopted as the clutchless compressor, if thermal load on the compressor is low (which corresponds to a state in which the clutch of a compressor of a clutch-equipped type is disengaged), the evaporator is cooled by the refrigerant to cause a surface of the evaporator to be frosted to freeze the evaporator, which makes it difficult to ventilate the evaporator, and in some cases results in a spoiled refrigerating function of the compressor.

To eliminate the above inconvenience, a technique of reducing the minimum delivery quantity to zero when thermal load is decreased has been proposed e.g. by Japanese Laid-Open Patent Publication (Kokai) No. 7-293437. This technique is based on the fact that a variable capacity swash plate compressor has a structure which permits the inclination angle of the swash plate to be reduced to zero (state in which the swash plate is at right angles to a drive shaft of the compressor), whereby the minimum delivery quantity can be reduced to zero.

Another technique for the same purpose has been proposed e.g. by Japanese Laid-Open Patent Publication (Kokai) No. 7-290940, in which a shortcut passage bypassing the evaporator is provided for the freezing circuit to directly connect the liquid tank and the compressor via the shortcut passage when thermal load on the compressor is low, to thereby inhibit refrigerant from circulating through the evaporator.

However, in the case of the technique of reducing the minimum delivery quantity to zero, the compressor is required to be constructed such that the refrigerant can be circulated within the compressor and the delivery quantity can be recovered from zero (by increasing the inclination angle of the swash plate from zero). This is because if the inclination angle of the swash plate is equal to zero when the compressor is started, it is impossible to obtain the back pressure of pistons.

Further, since the amount of refrigerant circulating through the compressor is largely reduced to zero or almost zero, it is required to eliminate heat generated in the compressor or cope with the shortage of lubricant which is to be supplied from the circulating refrigerant.

On the other hand, in the case of the technique of providing the shortcut passage for the freezing circuit, which bypasses the evaporator for use when the thermal load is low, the liquid tank is short-circuited or directly connected to the compressor to return the liquid refrigerant to the compressor, which causes so-called liquid compression, resulting in breakage of the compressor.

SUMMARY OF THE INVENTION

It is an object of the invention to provide an air conditioning system which is capable of cooling and lubricating the interior of a compressor thereof when a thermal load on an evaporator of the system is low as well as preventing occurrence of liquid compression.

To attain the above object, the present invention provides an air conditioning system including a clutchless compressor to which a driving force is constantly transmitted via a pulley, a condenser for causing a high-temperature and high-pressure gaseous refrigerant compressed by the clutchless compressor to change to a high-pressure liquid refrigerant through heat exchange with external air, an expansion valve for adiabatically expanding the high-pressure liquid refrigerant to thereby change the high-pressure liquid refrigerant into a low-pressure atomized refrigerant, and an evaporator for evaporating the low-pressure atomized refrigerant through heat exchange with the external air.

The air conditioning system according to the invention is characterized by comprising:

heating means for heating the evaporator; and control means for causing the heating means to operate to heat the evaporator when a thermal load on the evaporator is low.

According to this air conditioning system, when the thermal load on the system is low, the control means causes the heating means to operate to heat the evaporator, whereby it is possible to prevent the evaporator from freezing. Therefore, there is no need to reduce the minimum delivery quantity to zero, thereby making it possible to positively cause a sufficient amount of refrigerant to circulate through the clutchless compressor.

Further, the air conditioning system is not configured to directly connect the liquid tank and the compressor via a shortcut passage. Therefore, the liquid refrigerant is prevented from returning to the compressor whereby it is possible to prevent liquid compression, and breakage of the compressor caused by the liquid compression.

Preferably, the control means includes thermal load-detecting means for detecting the thermal load on the evaporator.

The above-mentioned condition "when a thermal load on the evaporator is low" is e.g. when the temperature of the evaporator is lower than a predetermined value.

Therefore, preferably, the thermal load-detecting means comprises a temperature sensor for detecting a temperature of the evaporator.

The above-mentioned condition "when a thermal load on the evaporator is low" is e.g. when the suction pressure of the clutchless compressor evaporator is lower than a predetermined value.

Therefore, preferably, the thermal load-detecting means comprises a pressure sensor for detecting a suction pressure of the clutchless compressor.

Preferably, the heating means comprises an electric heater.

Alternatively, the heating means comprises a hot-water heater.

Alternatively, the heating means comprises a hot-air heater.

Preferably, the clutchless compressor is a variable capacity swash plate compressor having a swash plate, the swash plate undergoing changes in inclination angle according to a suction pressure to thereby change a length of piston stroke for increasing or decreasing delivery quantity of the variable capacity swash plate compressor.

According to this preferred embodiment, to prevent the evaporator from freezing, the system is configured to heat the evaporator and hence there is no need to reduce the inclination angle of the swash plate of the swash plate compressor to zero to reduce the minimum delivery quantity to zero. As a result, means for recovering the delivery quantity becomes unnecessary, and it is possible to positively cause a sufficient amount of refrigerant to circulate through the clutchless compressor, and hence to smoothly carry out cooling and lubrication of the inside of the swash plate compressor.

The above and other objects, features and advantages of the present invention will become more apparent from the following detailed description taken in conjunction with accompanying drawings.

DETAILED DESCRIPTION OF THE PREFERRED EMBODIMENTS

The invention will now be described in detail with reference to the drawings showing preferred embodiments thereof.

Figure 1:
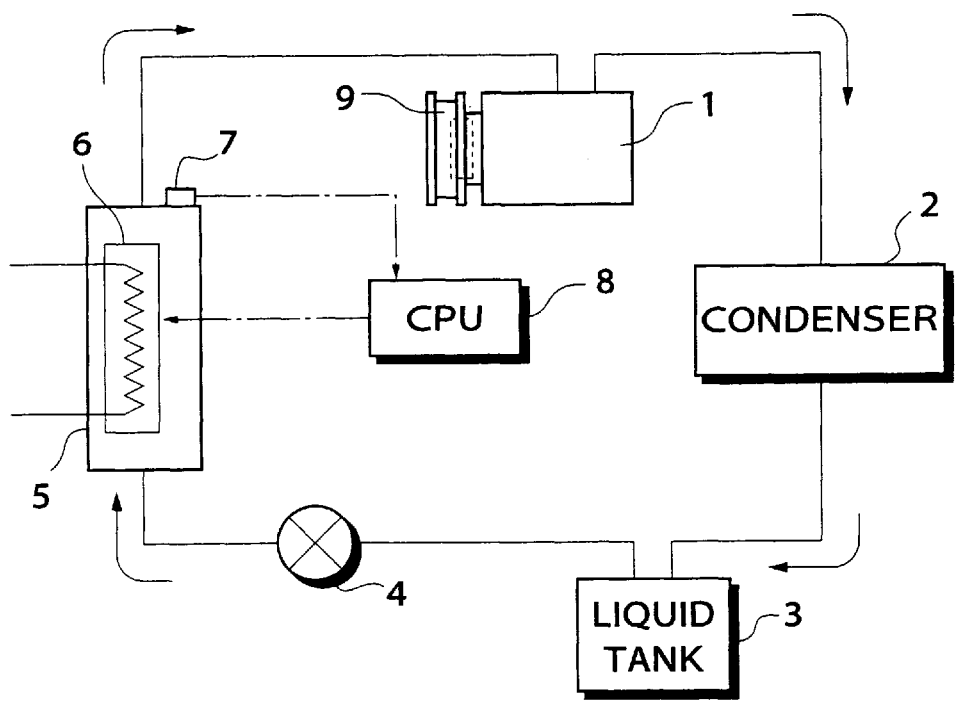
FIG. 1 is a diagram schematically showing the whole arrangement of an air conditioning system according to a first embodiment of the invention.

Referring first to FIG. 1, there is schematically shown the whole arrangement of an air conditioning system according to a first embodiment of the invention.

The air conditioning system includes a clutchless compressor 1 to which a driving force is constantly transmitted via a pulley 9 from an engine installed on an automotive vehicle, neither of which is shown, a condenser 2 for causing a high-temperature and high-pressure gaseous refrigerant compressed by the clutchless compressor 1 to change to a high-pressure liquid refrigerant through heat exchange with external air, a liquid tank 3 for separating the high-pressure refrigerant delivered from the condenser 2 into gas and liquid, an expansion valve 4 for adiabatically expanding the liquid refrigerant from the liquid tank 3 to thereby change the same into a low-pressure atomized refrigerant, and an evaporator 5 for evaporating the atomized refrigerant sent from the expansion valve 4 through heat exchange with the external air.

As the above clutchless compressor 1, there may be employed a variable capacity swash plate compressor, for instance. In the variable capacity swash plate compressor, the inclination angle of a swash plate thereof changes according to the suction pressure of the compressor to change the length of piston stroke, whereby the delivery quantity of the compressor is increased or decreased.

As shown in FIG. 1, the air conditioning system according to the embodiment is provided with an electric heater (heating means) 6 for heating the evaporator 5, a temperature sensor (thermal load-detecting means) 7 for detecting the temperature of the evaporator 5, and a control system (control means) 8 for causing the electric heater 6 to operate to heat the evaporator 5 when the temperature of the evaporator 5 detected by the temperature sensor 7 is below a predetermined value (e.g. −1° C. ). The predetermined value may be set e.g. to 0° C.

The electric heater 6 and the temperature sensor 7 are electrically connected to the control system (e.g. comprised of a CPU) 8. The electric heater 6 is operated by electric power supplied from a battery, not shown, installed on the vehicle.

Next the operation of the air conditioning system will be described hereinafter.

When the air conditioning system is switched on, a blower is driven to selectively bring an external air or an internal air into an intake unit, not shown.

The driving force is constantly transmitted from the engine via the pulley 9 to the clutchless compressor 1. The clutchless compressor 1 compresses the refrigerant to a high-temperature and high-pressure refrigerant and sends the same to the condenser 2.

In the condenser 2, the refrigerant is cooled by an external air lower in temperature than the refrigerant, whereby the refrigerant is caused to change from a gaseous state to a liquid state.

The liquefied refrigerant is sent to the liquid tank 3 wherein water content and dust mixed into the refrigerant are removed and at the same time the refrigerant is separated into gas and liquid.

The liquid refrigerant which has flown out from the liquid tank 3 is guided to the expansion valve 4.

In the expansion valve, the high-pressure liquid refrigerant is drastically expanded to change into an atomized refrigerant which is low in temperature and pressure.

The resulting low-temperature and low-pressure atomized refrigerant is sent to the evaporator 5 where the refrigerant absorbs heat from the air outside the evaporator 5 to evaporate.

The refrigerant evaporated in the evaporator 5 into a gaseous refrigerant returns to the clutchless compressor 1.

When the thermal load on the evaporator 5 is small and hence the pressure (suction pressure) of the refrigerant returning to the clutchless compressor 1 is low, the inclination angle of the swash plate is decreased to thereby reduce the length of piston stroke to decrease the delivery quantity of the compressor 1.

The smallest inclination angle to which the swash plate controlled to minimize the length of piston stroke is not equal to zero, so that the evaporator 5 is cooled by the refrigerant at this minimum capacity or delivery quantity of the compressor. The temperature of the evaporator 5 is monitored by the temperature sensor 7. When the temperature of the evaporator 5 becomes lower than a predetermined value, the control system 8 causes the electric heater 6 to operate. As a result, the evaporator 5 is heated by the electric heater 6 to prevent freezing of the evaporator 5.

On the other hand, when thermal load on the evaporator 5 is large and hence the pressure of the refrigerant returning to the clutchless compressor 1 is high, the inclination angle of the swash plate is made larger to increase the length of piston stroke whereby the delivery quantity of the compressor 1 is increased.

To prevent the evaporator 5 from freezing, the air conditioning system according to the first embodiment does not employ the technique of reducing the delivery quantity to zero but is configured to heat the evaporator 5. Therefore, the compressor is not required to include means for recovering the delivery quantity, and a sufficient amount of refrigerant can be positively circulated through the compressor to cool and lubricate the interior of the compressor. Further, the liquid refrigerant is prevented from flowing into the clutchless compressor 1 to thereby prevent breakage of the compressor, which otherwise can be caused by the liquid compression.

Although in the above embodiment, the control system 8 causes the electric heater 6 to operate to heat the evaporator 5 when the temperature of the evaporator 5 becomes lower than a predetermined value, which is an example of the method of detecting of the low thermal load on the evaporator 5, this is not limitative, but instead, the suction pressure of the clutchless compressor 1 may be monitored by a pressure sensor, not shown, to thereby cause the electric heater 6 to operate to heat the evaporator 5 when the suction pressure detected by the pressure sensor is below a predetermined value (e.g. 0.3 megapascal: absolute pressure corresponding to 0° C. when R134A is used as the refrigerant).

Figure 2:
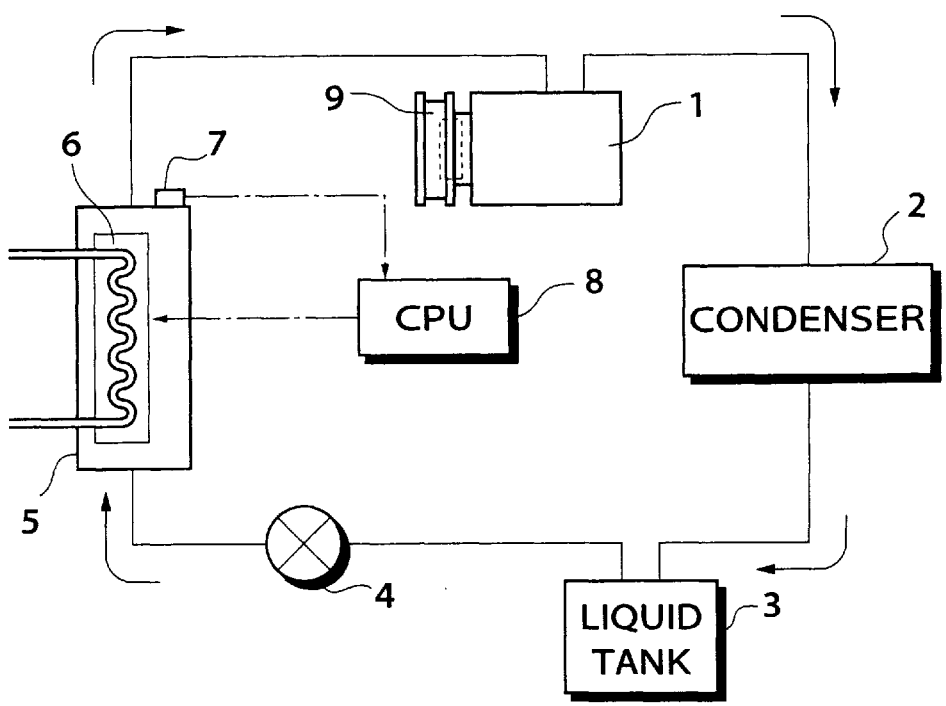
FIG. 2 a diagram schematically showing the whole arrangement of an air conditioning system according to a second embodiment of the invention.

FIG. 2 shows an air conditioning system according to a second embodiment of the invention. Component parts and elements corresponding to those of the above first embodiment are indicated by identical reference numerals, and description thereof is omitted.

This embodiment is distinguished from the first embodiment in which the electric heater 6 is employed as heating means, in that, as shown in FIG. 2, a hot-water heater 16 using engine coolant as a heat source is used instead of the electric heater 6.

The air conditioning system according to the second embodiment provides the same effect as obtained by the system of the first embodiment.

Figure 3:
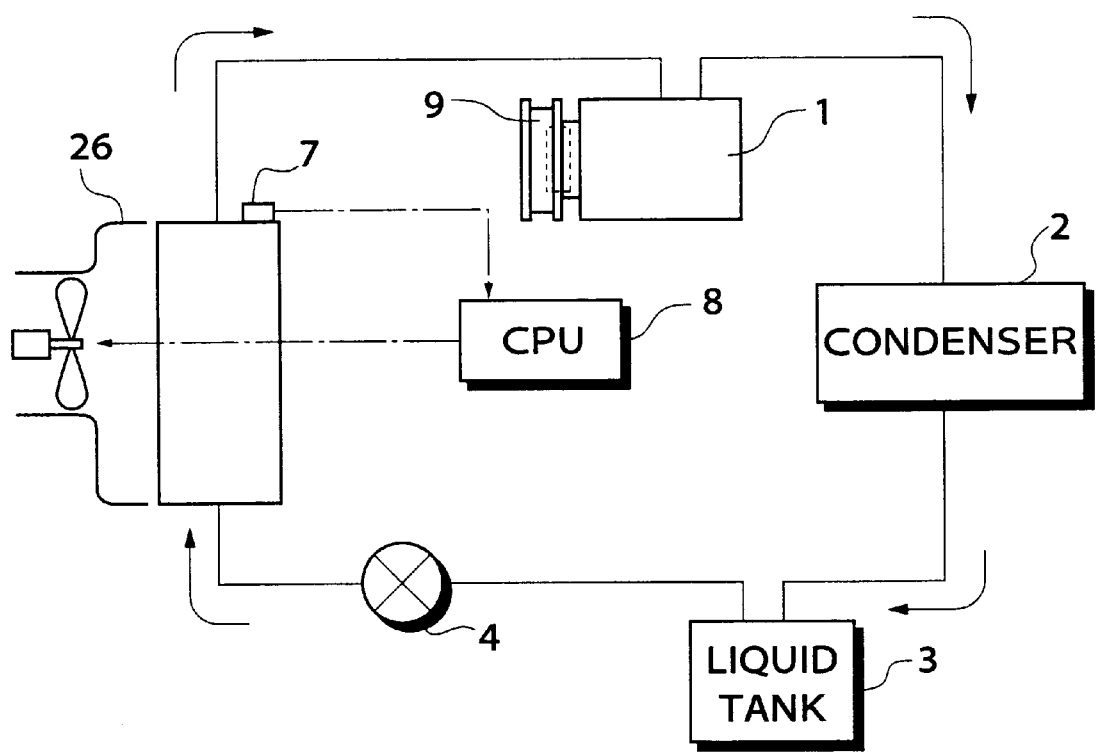
FIG. 3 a diagram schematically showing the whole arrangement of an air conditioning system according to a third embodiment of the invention.

FIG. 3 shows an air conditioning system according to a third embodiment of the invention. Component parts and elements corresponding to those of the above first embodiment are indicated by identical reference numerals, and description thereof is omitted.

This embodiment is distinguished from the first embodiment in which the electric heater 6 is employed as heating means, in that, as shown in FIG. 3, a hot-air heater 26 using warm air having passed a heater core, not shown, as a heat source is used instead of the electric heater 6.

The air conditioning system according to the third embodiment provides the same effect as obtained by the system of the first embodiment.

According to the air conditioning system of the invention, the clutchless compressor is adopted and even when the thermal load is low, the evaporator is prevented from freezing to secure a sufficient amount of refrigerant circulating through the compressor. Therefore, the air conditioning system according to the invention is suitable for use in an automotive vehicle on which an engine (engine of a type in which gasoline is directly injected into a cylinder without mixing it with air) of so-called a direct in-cylinder injection type, which is more adversely affected by a variation in torque (caused by engagement/disengagement of the clutch for connection to the compressor) during idling of the engine than a typical engine. Further, the air conditioning system according to the invention is also suitable for use in a light automobile.

It is further understood by those skilled in the art that the foregoing is the preferred embodiments of the invention, and that various changes and modification may be made without departing from the spirit and scope thereof.

What is claimed is:

1. In an air conditioning system including a clutchless compressor to which a driving force is constantly transmitted via a pulley, a condenser for causing a high-temperature and high-pressure gaseous refrigerant compressed by said clutchless compressor to change to a high-pressure liquid refrigerant through heat exchange with external air, an expansion valve for adiabatically expanding said high-pressure liquid refrigerant to thereby change said high-pressure liquid refrigerant into a low-pressure atomized refrigerant, and an evaporator for evaporating said low-pressure atomized refrigerant through heat exchange with said external air, the improvement comprising:

heating means for heating said evaporator; and control means for causing said heating means to operate to heat said evaporator when a thermal load on said evaporator is low.

2. An air conditioning system according to claim 1, wherein said control means includes thermal load-detecting means for detecting said thermal load on said evaporator.

3. An air conditioning system according to claim 2, wherein said thermal load-detecting means comprises a temperature sensor for detecting a temperature of said evaporator.

4. An air conditioning system according to claim 2, wherein said thermal load-detecting means comprises a pressure sensor for detecting a suction pressure of said clutchless compressor.

5. An air conditioning system according to claim 2, wherein said heating means comprises an electric heater.

6. An air conditioning system according to claim 2, wherein said heating means comprises a hot-water heater.

7. An air conditioning system according to claim 2, wherein said heating means comprises a hot-air heater.

8. An air conditioning system according to claim 1, wherein said heating means comprises an electric heater.

9. An air conditioning system according to claim 1, wherein said heating means comprises a hot-water heater.

10. An air conditioning system according to claim 1, wherein said heating means comprises a hot-air heater.

11. An air conditioning system according to claim 1, wherein said clutchless compressor is a variable capacity swash plate compressor having a swash plate, said swash plate undergoing changes in inclination angle according to a suction pressure to thereby change a length of piston stroke for increasing or decreasing delivery quantity of said variable capacity swash plate compressor.

* * * * *